United States Patent [19]

Raible et al.

[11] Patent Number: 4,925,343

[45] Date of Patent: May 15, 1990

[54] OIL SPILL CLEANUP COMPOSITIONS

[76] Inventors: Robert L. Raible, Box 521; Johnnie L. Loggains, Box 276, both of Grady, Ark. 71644

[21] Appl. No.: 383,643

[22] Filed: Jul. 24, 1989

[51] Int. Cl.⁵ .............................................. E02B 15/00
[52] U.S. Cl. ...................................... 405/60; 210/924
[58] Field of Search ................................ 405/60, 63, 52; 210/924, 925, 484, 242.4, 660, 690, 691, 282, 671, 693, 483, 680

[56] References Cited

U.S. PATENT DOCUMENTS

| | | | |
|---|---|---|---|
| 3,464,920 | 9/1969 | Pirson et al. | 210/924 X |
| 3,739,913 | 6/1973 | Bogosian | 210/484 X |
| 3,770,575 | 11/1973 | Ball | 210/924 X |
| 3,812,973 | 5/1974 | Stern | 210/924 X |
| 3,888,766 | 6/1975 | DeYoung | 210/693 X |
| 3,976,570 | 8/1976 | McCray | 210/693 X |
| 4,102,783 | 7/1978 | Zenno et al. | 210/691 |
| 4,172,031 | 10/1979 | Hall et al. | 210/691 X |
| 4,537,877 | 8/1985 | Ericsson | 210/924 X |
| 4,692,059 | 9/1987 | Juutilainen | 405/63 |
| 4,784,773 | 11/1988 | Sandberg | 210/242.4 X |

*Primary Examiner*—Dennis L. Taylor
*Attorney, Agent, or Firm*—Llewellyn A. Proctor

[57] ABSTRACT

Compositions useful for absorbing oil from the surface of oil contaminated water, or land, constituted of a particulate admixture of wood fiber, preferably in concentration ranging about 20 to 70 wt. %, and hydrophobic, organophilic water wettable cotton linters, preferably in concentration ranging from about 80 to 30 wt. %. The compositions can be spread upon the oil contaminated water, or land, to absorb the oil, and the oil contaminated compositions then swept up or otherwise removed, and disposed of to leave the water or land surface cleansed of oil.

20 Claims, No Drawings

OIL SPILL CLEANUP COMPOSITIONS

FIELD OF THE INVENTION

This invention relates to compositions useful for the containment and cleanup of oil spills from the surface of water or from land. In particular, it relates to novel particulate compositions which have a high affinity for oils, and are suitable for use in the cleanup of oil from water surfaces and land areas.

BACKGROUND AND PROBLEMS

Oil discharges, inclusive of accidental spills and runoff of oily wastes from drilling sites, have contaminated large land areas, creating direct hazards to the use of land. Streams have been contaminated by oily wastes, and marshlands and estuaries have been adversely affected by the runoff of oily wastes from contaminated land and streams.

Fissures have developed in offshore wells creating oil slicks on the surface which have fouled inland waters, beaches, and recreational areas. Major spills arising from maritime accidents, due to the large volumes of oil discharged into the seas by large tankers, have proven catastrophic. The effects on marine life, birds, and animals short term has been calamitous; and long term the total environmental effect, though yet largely unknown, may be worse.

Present techniques for controlling and removing an oil slick from surface waters leave much to be desired. Particulate, granular and fibrous materials capable, to some extent of floating and imbibing or absorbing oils, have been spread on water surfaces and the oily material then recovered by "sweep-up." Exemplary of such materials are, e.g., textile fibers, sawdust, wood chips, hay, straw, ground bark, and the like. Bogosian's U.S. Pat. No. 3,739,913 assigned to Johns-Manville Corporation, e.g., mentions the use of nylon fiber, rayon fiber, TEFLON shavings, polyester fiber, glass fiber, and fibers of wool or cotton. U.S. Pat. No. 4,519,918 teaches forming a hydrophobic oil absorption material from wood, cotton and other materials by treating the material with resin, or copolymer. These materials for use in containing oil spills, or for oil spill cleanup, have generally proven less effective than desired. Some of these materials simply are not adequately absorbent to pick up large quantities of oil from the water surface. Others, even when used in relatively large amounts, leave an oil sheen on the water surface. Some all too quickly become water logged and sink below the surface of the water such that the oily material cannot be recovered. This has created environmental problems for marine life at the bottom of the sea. Some absorb oil all too slowly, and the oil does not bond to the material with high affinity. Few, if any, of these materials are effective as agents for scrubbing the soil, and exposed rocks of an oil contaminated shore. The recent large oil spill in Prince William Sound off Alaska and national T.V. coverage has demonstrated to the world the present lack of effective technology for the cleanup of oil contaminated shores. For these and other reasons, there exists a clear present need for more effective oil spill fencing and cleanup materials.

OBJECTS d It is, accordingly, a primary object of the present invention to supply this need and others.

In particular, it is an object to provide a novel particulate composition which has good buoyancy and can float on an oil slick water surface for long periods, has high absorbent capability for removing oil from the surface of the water, and retaining same such that the oil contaminated water surface can be cleaned by pick up or sweeping up the oil contaminated composition from the water surface.

A further object is to provide a material, as characterized useful and effective as an agent for scrubbing and cleaning the oil contaminated soil and rocks, to remove oil from an oil contaminated shore, or other land area.

A yet further, and more specific object, is to provide a material which can be used as a fencing material to surround and cut off an oil emitting source to inhibit, suppress, or prevent further spread of oil to uncontaminated water or land areas.

STATEMENT OF THE INVENTION

These objects and others are achieved in accordance with this invention which embodies as a composition, or article of manufacture, a particulate wood fiber, and hydrophobic, organophilic water wettable cotton linters in admixture. In its preferred aspects, the composition embodies an admixture of from about 20 percent to about 70 percent, preferably from about 30 percent to about 50 percent of a particulate wood fiber and from about 80 percent to about 30 percent preferably from about 70 percent to about 50 percent, of a hydrophobic, organophilic water wettable cotton linters, or cotton lint, based on the total weight of the composition. This composition can be spread upon the oil contaminated water, or land to absorb the oil. The oil contaminated composition can then be picked up and disposed of to leave the water or land surface cleansed of oil. For example, this composition can be spread upon an oil slick floating on the surface of a body of water, and the oil slick covered to absorb the oil. The oil-containing composition can then be swept up or otherwise removed from the surface of the water to effectively remove and cleanse the oil from the surface of the water. The composition can likewise be spread upon the surface of an oil-contaminated area of land, e.g., a seashore or beach, and left there for a period sufficient for the composition to absorb the oil from the soil. The oil-contaminated area of land can then be cleansed of oil by removing the oil-contaminated composition. An effective way of cleansing an oil-contaminated shore, e.g., is to spread the composition on top of the oil-contaminated area allow time for the composition to absorb the oil, and then wash the oil soaked composition into the water. The oil soaked composition, which floats on the surface of the water, can then be recovered. e.g., by sweep up from the surface of the water.

The wood fiber is a granulated or powdered, material made from wood chips containing a residue of urea and formaldehyde, generally at about an 8 to 10 percent level, based on the total weight of the wood fiber. It may, and generally does, also contain from about 8 to about 18 percent moisture based on the total weight of the wood fiber. The bulk density, or weight per cubit foot of the wood fiber generally ranges from about 1½ to about 2 pounds. An especially preferred wood fiber can be obtained as a waste product from a particle board manufacturing operation in which water-steam softened wood chips, notably pine wood chips boiled in water, are admixed with urea and paraffin wax, or formaldehyde resin urea and paraffin wax, and the processed wood chips pressed between rolls to form particle board. Wood chips, crumbs or sawdust constituted of the same or essentially the same composition as the particle board are left behind as waste; this waste product being particularly useful in forming the composition of this invention. Likewise, sawdust derived from the particle board by sanding sawing or grinding the particle board to dust form is suitable in forming the composition of this invention. A process of this type is described by *Kirk-Othmer, Encyclopedia of Chemical Technology,* Volume 14;1. Laminated Wood Based Composites.

The wood fiber of this invention is preferably a by product of the sanding and sawing operations employed in the production of particle boards—low density, medium density or high density. The process of producing particle board includes generally the steps of breaking wood—a cellular material with straight (parallel) grain (fibers) that is obtained from trees—into small chips, flakes, shavings or particles and then with the use of resin binders, reassembling them into boards or panels. The wood chips or shavings obtained from the logs are further reduced in size by flakers and hammermills, then screened and dried to reduce moisture. The screened, graded wood chips, particles or flour is sprayed with a resin binder, or adhesive, formed into mats and then pressed to cure the resin binder and form the particle board. Typically, the wood fiber mat is pressed at temperatures ranging up to about 200° C., and at pressures ranging up to about 1000 psi depending to some extent on the density and type of particle board to be produced. Typically the particle board is then sanded, or sawed into panels of regular measured shape, these operations producing a by product which is admirably suitable as the wood fiber component of this invention. Phenol, or phenolic resins, and/or resorcinol based resins are generally the resins of choice where the particle boards are to be used in a high humidity environment. On the other hand, urea-formaldehyde and melamine-formaldehyde resins, polyurethanes, lignin sulfonates and poly (vinyl acetate) emulsions are often used as the resins of choice to make particle board which is not to be used in a non-humid environment and high durability is not required. Typical phenols which are condensed with formaldehyde to make the resins include cresol, t-butyl phenol, octyl phenol, xylenol, resorcinol and bisphenol A.

The resin used in reassembling the wood chip particles or shavings into a particle board, or a residue thereof remains within the by product wood fiber component of the compositions of this invention. The presence of the resin, or resin residue in the wood fiber apparently physically blocks and closes, some of the natural pores of the wood. This reduction in the porosity of the cellular wood material suppresses, inhibits or retards, to some extent the natural tendency of the wood to imbibe water, although the wood retains its affinity for absorbing oils or hydrocarbons. The reason or reasons for the effectiveness of wood fiber and cotton lint admixtures as an oil spill cleanup composition is not known.

The cotton lint component of the oil sweep composition of this invention is obtained by delinting cotton seed and it is available in this country as a by product from commercial cotton seed delinting processes. Currently operated cotton seed delinting plants generally employ one of two chemical processes: one, a wet acid process using sulfuric acid; the other, a dry acid process using anhydrous hydrochloric acid. The lint from either, or from other sources, is useful in the practice of this invention.

A preferred cotton lint is one commercially available as a by product from a gas (dry) hydrochloric acid cotton seed delinting operation; which like the wood fiber component, is a waste product. In producing the cotton lint, a fuzzy gin run cotton seed after drying and scalping cleaning is treated in a sealed reaction chamber with agitation, while contacted by anhydrous hydrochloric acid gas, generally at concentration ranging from about 0.5 percent to about 2 percent of cotton seed weight at temperature sufficient to promote delinting efficiency; temperatures ranging generally from about 60° C. to about 70° C. Reaction time generally ranges from about 5 to about 20 minutes. The dry acid delinting process is a combination of interrelated chemical, and mechanical actions with the hydrochloric acid concentration temperature, reaction time and amount of agitation being balanced to increase the efficiency of the operation and suppress attack by the hydrochloric acid which weakens the cotton fiber. The seed and lint in a subsequent step, are contacted with ammonia to neutralize the acid, neutralization generally being carried out by contact with a sufficient amount of the ammonia to reduce the pH of the cotton seed between about 5.5 and 8.0. Generally, about one-half pound of ammonia is used for each pound of hydrochloric acid. Treated cotton seed is run through linters where the lint and seed are separated. During this process, small seed and lint are separated from large seed. The large seed is used for planting and the small seed and lint are by products. The lint useful in forming the composition of this invention is separated from the small seed.

A wide number of varieties of cotton seed can be delinted to form cotton lint suitable for forming the compositions of this invention. Exemplary of cotton seed useful for this purpose are, e.g. Acala SJ-1, Delta Pine 16, Quapaw Coker 310, Paymaster 111 and Stoneville 213. The different varieties of cotton seed differ in the concentration of acid, and temperature, required to delint the seed, and in their ease in delinting. While operating at a preselected temperature, Acala SJ-1 and Delta Pine cotton seed are thus more easily delinted than Paymaster 111 and Stoneville 213, which are the most difficult of those mentioned; with Quapaw and Stoneville 213 are of intermediate difficulty to delint. At higher acid concentrations, the Acala and Delta Pine varieties continue to delint at lower temperatures than Quapaw and Coker 310, and the Paymaster 111 and Stoneville 213 varieties require higher temperatures.

The components forming the oil sweep composition of this invention are placed together in intimate admixture generally by adding the dry cotton lint and wood fiber together in a mechanical mixer, and stirring for about one-quarter hour. The admixture is then conveyed to a hammer mill with milo size screen, from there to a mixer where it is stirred for about 10 minutes and thereafter it is packaged in air tight containers. The oil spill sweep is stored for at least about 48 hours and preferably for at least 15 days before using. There appears some sort of interaction or chemical reaction during this period which enhances the oil absorption propensity of the admixture of wood fiber and cotton linters, the nature of which is not understood. The material has a shelf life of at least three years when properly stored.

The oil sweep composition of this invention is biodegradable, non-toxic and it is a good soil conditioner. When soaked in oil it can be buried, or burned. The composition of this invention particularly when the cotton lint and wood fiber are blended together in quantity sufficient to provide cotton lint:wood fiber weight ratios ranging from about 80:20 to about 30:70, preferably from about 70:30 to about 50:50, have been found effective in absorbing various grades of hydrocarbons ranging from light and heavy naphthas, e.g. gasoline mid-distillates, e.g., diesel fuel, kerosene, heating oil and the like through high molecular weight hydrocarbons, asphalt residua and the like; including light and heavy petroleum crudes, from conventional and non-conventional sources, coal liquids, shale oils and the like. The oil sweep compositions of this invention have been found highly oil absorptive in pick up of oil from a water surface, and from a land surface. Moreover, these compositions remain afloat on a salt water or fresh water surface for long periods, periods greatly in excess of the time periods normally required for sweep up of an oil contaminated composition from the surface of a body of oil contaminated water. For example, a composition wherein the cotton lint and wood fiber were blended together in a weight ratio of cotton lint:wood fiber of about 70:30 was observed to be floating over four weeks after it was spread upon an oil contaminated water surface.

The following non-limiting examples, and comparative data illustrate the more salient features, the nature, and manner of practicing the invention. In the examples and demonstrations which follow components. compositions and ratios are given in terms of weight units except as otherwise specified.

EXAMPLES 1–9

For comparative purposes, a by product wood fiber, or sawdust, from a particle board manufacturing plant was admixed in varying proportions with a cotton lint by product from a gas-acid cotton planting seed delinting process to form an oil-sweep composition. These compositions were made by admixing the wood fiber and cotton lint in varying weight proportions; the cotton lint:wood fiber in weight ratios ranging from 90:10 through 10:90; the wood fiber:cotton lint in weight ratios ranging from 90:10 through 10:90. These admixtures were applied as an oil spill sweep and their performance for this purpose was compared with portions of the wood fiber and cotton lint, respectively; viz., a wood fiber with which none of the cotton lint was blended and a cotton lint with which none of the wood fiber was blended.

In each of a first series of tests, fresh water at ambient condition was charged into clear glass jars which provided a 100 cm$^2$ water surface area and 50 gram portions of 30 w diesel motor oil was poured onto the surface of the water in each of the jars. Twenty gram portions of the wood fiber cotton lint admixtures and 20 gram portions of the wood fiber and cotton lint, respectively, were then spread over the oil surface. Four different types of observations were made in these tests to determine the effectiveness of each admixture and the wood fiber and cotton lint, respectively, in absorbing and removing the oil from the water surface, the rate of absorption of the oil, the ability of the compositions to retain the oil when removed from the water surface and the ability of the compositions to remain afloat for sufficient time to be swept up or otherwise removed from the water surface. Empirical performance numbers ranging from 1 through 10 were assigned in rating the results of the tests. The higher the number the more effective the observed test result; or conversely, the lower the number the less effective the observed test result.

The first two columns of Table 1 below quantitatively identifies the components of the oil sweep compositions spread on top of the oil. The remaining four columns, numbered A, B, C and D lists performance characteristics for each of four tests, to wit:

A. On separating the respective oil containing composition from the water surface after a 24 hour period, the visually observed amount of oil slick remaining on the surface of the water. A 10 rating indicates there was no sign of an oil slick, whereas a 1 rating indicates a considerable amount of oil slick left on the surface of the water. Ratings between 1 and 10 indicate proportionally the pro rata amount of oil remaining on the surface of the water.

B. The period required for uptake of the oil by the composition. A 10 rating indicates that the composition poured on top of the oil absorbed essentially all of the oil in less than 15 minutes. A 1 rating indicates that more than 1 hour was required for uptake of the oil by the composition. Ratings between 1 and 10 indicate proportion the pro rata amount of time required for absorption of the oil between 15 minutes and 1 hour.

C. After separating the composition from the water surface the amount of oil gravity separated from the absorbent as it is lifted from the water surface. A 10 rating indicates no separation, and a 1 rating indicates approximately 50 weight percent separation. Ratings between 1 and 10 indicate proportionally the pro rata amount of oil separated from the absorbent over the same period of time.

D. The floatability or ability of the composition to remain afloat after a 12 hour period. A 10 rating indicates that essentially 100% of the oil-soaked composition remained afloat after the 12 hour period, whereas smaller numbers—1 being the worse case—indicates that some portion of the material sinks after the 12 hour period.

TABLE 1

| Mixture-Wt. % | | Ratings of Tests | | | |
|---|---|---|---|---|---|
| Cotton-lint | Wood fiber | A | B | C | D |
| 100 | 0 | 1 | 10 | 3 | 10 |
| 90 | 10 | 3 | 10 | 3 | 10 |
| 80 | 20 | 4 | 10 | 5 | 10 |
| 70 | 30 | 10 | 10 | 8 | 10 |
| 60 | 40 | 10 | 8 | 10 | 10 |
| 50 | 50 | 10 | 6 | 10 | 10 |
| 40 | 60 | 8 | 5 | 10 | 10 |
| 30 | 70 | 6 | 4 | 10 | 8 |
| 20 | 80 | 6 | 3 | 10 | 6 |
| 10 | 90 | 4 | 3 | 10 | 4 |
| 0 | 100 | 1 | 1 | 5 | 1 |

These data show that cotton lint to which no wood fiber has been added is relatively poor as an oil sweep composition. Albeit it satisfactorily takes up oil in relatively short time. It leaves much oil on the surface of the water after sweep up. It has good floatability, however on separation of the composition from the water surface much of the oil is gravity separated to return to the water surface. On the other hand, the wood fiber is poor in all respects. In terms of gravity separation, the highest rating in these classifications, it scores only a 5. The highest ratings for the admixed compositions clearly fall within cotton lint:wood fiber ratios ranging from about 80:20 to about 30:70 (or wood fiber:cotton lint ratios ranging from about 20:80 to about 70:30). and preferably from about 70:30 to about 50:50 (or wood fiber:cotton lint ratios ranging from about 30:70 to about 50:50). An oil sweep composition made by blending about 70 wt. percent of the treated cotton lint with about 30 wt. percent of the wood fiber appears close to optimum.

If the ratio of wood fiber in the admixture is too high as will be observed from the data, the ability of the oil sweep composition to absorb oil the time required for absorption of the oil its floatability are lessened. In contrast, when the ratio of the cotton lint in the admixture is too high, the ability of the oil sweep composition to absorb oil is lessened, and it tends to release the oil more readily by gravity separation. A too high ratio of the cotton lint also makes the composition more dusty and harder to handle. In any regard, it is quite apparent that the oil sweep composition of this invention will absorb at least 2½ times its own weight and will remain afloat for sufficient time to permit mechanical recovery.

EXAMPLES 10-18

In another series of tests conducted over a 96 hour period, 40 gram and 60 gram portions of an oil sweep composition constituted of cotton lint and wood fiber in cotton lint:wood fiber weight ratio of 70:30 were spread on top of a water surface, within a glass jar, on which 100 grams of various grades of oil had been poured. The float time and sink time, in hours of the oil soaked oil sweep compositions were observed for each of these tests, and these tests compared with a similar test in which no oil was added to the glass jar. The results are described by reference to Table 2; Columns 1 and 2 listing the amount and kind of oil added to the water. Column 3 the floating time of the oil soaked oil sweep composition in hours and Column 4 the time in hours required for certain of the oil soaked compositions to sink.

TABLE 2

| Oil Sweep Composition | 100 Grams Oil in a Container of Water 96 Hour Time Period | | |
|---|---|---|---|
| | Treatment | Floating Time (Hr.) | Sinking Time (Hr.) |
| 40 Grams | Water | 12 | 6 |
| 40 Grams | Diesel | 96 | |
| 40 Grams | 10w Motor Oil | 96 | |
| 40 Grams | 30w Motor Oil | 84 | |
| 40 Grams | Used Motor Oil | 96 | |
| 40 Grams | Used Motor Oil (in salt water) | 96 | |
| 60 Grams | Diesel | | 72 |
| 60 Grams | 30w Motor Oil | | 18 |
| 60 Grams | 90w Gear Oil | | 12 |

There was no oil slick left on the surface of the water when the oil soaked oil sweep composition and water was poured through a screen and the oil sweep composition separated from the water. This is clear evidence that essentially all of the various grades of oils were absorbed by the oil sweep compositions, even where the oil sweep compositions did not remain afloat for the 96 hour period.

EXAMPLE 19

A quantity of 50 w dirty burned oil was poured into the water near the shore line, forming a black oil slick. An admixture of cotton lint and wood fiber in a cotton lint:wood fiber weight ratio of 70:30, was then spread on the surface of the water upwind of and surrounding, the oil slick. Over a 24 hour period both the oil and oil sweep material were blown onto the edge of the beach, the oil being absorbed onto the oil sweep material forming essentially small crumbs or clots of sweep material within which essentially all of the oil was absorbed. The crumbs or clots were easily raked up from the shore and discarded leaving behind a clean beach. The oil had been completely removed from the water, and no oil sheen was observed.

EXAMPLE 20

When Example 19 was repeated except that an additional amount of the oil sweep material was also placed on the shore line, a similarly effective job was done in picking up the oil. The water was effectively cleaned and the crumbs or clots of oil soaked sweep material remained even closer to the water edge from where it was removed by raking.

EXAMPLE 21

Example 19 was repeated except that the surface of the floating oil slick, after its formation was covered with the oil sweep composition. After only a few hours, the oil sweep composition had essentially completely absorbed the oil, and the oil clotted material was readily picked up from the surface of the water with a filter screen.

EXAMPLE 22-24

A series of runs were made wherein gasoline, diesel fuel, and burnt diesel motor oil, respectively, were poured into clear glass vessels containing water. Thereafter a 70:30 admixture of the cotton lint and wood fiber as described by reference to Example 19, was poured on the top of the floating hydrocarbon or hydrocarbonaceous material. The contents of the vessels, after a very short time were poured through a screen into a second vessel; essentially all of the oil clotted material in each instance remaining upon the filter screen. The water transported through the screen in each instance was essentially clean of gasoline, diesel fuel, and the burnt diesel motor oil, respectively. Hardly any odor of the hydrocarbons remained in the water transported through the screen and there was no oil slick remaining on the surface of the water.

EXAMPLE 25

Three vessels were filled with clean water, and two small fish known as shiners were placed in the water of each vessel. These are fish known to be sensitive to toxic materials. To Vessel No. 1 was added a portion of the 70:30 oil sweep material as described in Example 19. The vessel was not aerated. A portion of diesel fuel was added to Vessel No. 2. and then the surface of the diesel fuel was covered with a portion of the 70:30 oil sweep material similar to that added to Vessel No. 1. The third vessel was continuously aerated with an air bore extended from the top to the bottom of the vessel and it was charged with a portion of the 70:30 oil sweep material similar to that employed in Vessel No. 1. Observations were continuously made of the condition of the fish.

The fish in Vessel No. 1 remained vigorous and healthy even at the end of a three hour period when the tests were arbitrarily discontinued. The same was true of the two fish in Vessel No. 3. at the end of the period.

In the second vessel however, one of the fish appeared to become sick, and prior to the end of the three hour period, died. The other appeared in satisfactory condition at the end of the three hour period. The fish apparently became ill and died by swimming too close to the surface before the oil sweep material had absorbed all of the diesel fuel from the surface of the water.

EXAMPLE 26

A 50 w dirty motor oil was poured upon the surface of the rocks of a rocky shore line. A 70:30 admixture of the oil sweep composition, as described in Example 19, was then spread upon the oil soaked rocks and allowed to remain there for a period of about 3 hours. The oil soaked composition which was formed on the rocks was then hosed and washed into the water beyond the shore line wherefrom it was picked up with a filter screen rolled into a ball and dumped. Very little oil remained upon the stones of the rocky beach and the water remained clean.

The following example demonstrates the high affinity the oil sweep composition has for hydrocarbons, and the utility of this composition in protecting wild life that lives in and near the water.

EXAMPLE 27

A 50 w dirty black, burnt motor oil was poured upon a water surface within an enclosure protected on all sides by an enclosing screen near which was floated some of the 70:30 admixture of the oil sweep composition as described in Example 19, to prevent escape of the oil outside the screened off area. An additional amount of the oil sweep composition was then spread on top of the floating oil.

After about 8 minutes two pure white ducks were placed on the surface of the water and they were encouraged to swim back and forth for several minutes through the burnt motor oil on top of which the oil sweep composition had been added. Thereafter, the ducks were lifted from the water and carefully examined. No oil whatever was found on the ducks. Both ducks remained clean and white. It was clear that the high affinity between the oil sweep composition and oil prevented the oil from soiling either of the ducks.

In contrast, when the test was repeated except that the floating oil was not covered by the oil sweep composition, both ducks were coated with oil over the entire area of exposure to the oil. Both ducks were ringed by the floating dirty black oil, even the lower portions and feet of the ducks being dirtied by the oil on lifting the ducks from the water.

It is apparent that some modifications and changes, such as in the origin, or in the ratio and proportions, of the components used in making the oil sweep compositions can be without departing the spirit and scope of the invention, as will be apparent to those skilled in this art.

Having described the invention, what is claimed is:
We claim:

1. A biodegradable composition useful for spreading upon the surface of oil-contaminated water, or lands, for absorbing oil from the surface of said oil-contaminated water, or land, and the oil-contaminated composition then readily removed by sweeping, which comprises a particulate admixture of a wood fiber, and acid-treated hydrophobit, organophilic water wettable cotton linters.

2. The composition of claim 1 wherein the wood fiber is a by product of a particle board manufacturing operation.

3. The composition of claim 2 wherein the wood fiber contains the residue of a resin binder employed in the particle board manufacturing operation.

4. The composition of claim 2 wherein the wood fiber contains a residue of urea and formaldehyde.

5. The composition of claim 2 wherein the wood fiber is the product of a particle board manufacturing operation in which pine wood chips are boiled in water and admixed with urea and paraffin wax or formaldehyde resin urea and paraffin wax.

6. The composition of claim 1 wherein the cotton linters is a by product of a cotton seed delinting operation.

7. The composition of claim 6 wherein the cotton linters is a by product of a gas hydrochloric acid cotton seed delinting operation.

8. The composition of claim 1 wherein the wood fiber is a by product of a particle board manufacturing operation, and the cotton linters is a by product of a cotton seed delinting operation.

9. A biodegradable composition useful for spreading upon the surface of oil-containing water, or land, for absorbing oil from the surface of said oil-contaminated water, or land, and the oil-contaminated composition then readily removed by sweeping which comprises
a particulate admixture of from about 20 percent to about 70 percent wood fiber, and
from about 80 percent to about 30 percent of acid-treated hydrophobic, organophilic water wettable cotton linters,
based on the total weight of the composition.

10. The composition of claim 9 wherein the wood fiber is a by product of a particle board manufacturing operation.

11. The composition of claim 10 wherein the wood fiber contains the residue of a resin binder employed in the particle board manufacturing operation.

12. The composition of claim 10 wherein the wood fiber contains a residue of urea and formaldehyde.

13. The composition of claim 10 wherein the wood fiber is the product of a particle board manufacturing operation in which pine wood chips are boiled in water and admixed with urea and paraffin wax or formaldehyde resin urea and paraffin wax.

14. The composition of claim 9 wherein the cotton linters is a by product of a cotton seed delinting operation.

15. The composition of claim 14 wherein the cotton linters is a by product of a gas hydrochloric acid cotton seed delinting operation.

16. The composition of claim 9 wherein the wood fiber is a by product of a particle board manufacturing operation and the cotton linters is a by product of a cotton seed delinting operation.

17. The composition of claim 9 wherein the admixture is comprised of from about 30 percent to about 50 percent of the particulate wood fiber and from about 70 percent to about 50 percent of the cotton linters.

18. The composition of claim 17 wherein the wood fiber is a by product of a particle board manufacturing operation.

19. The composition of claim 17 wherein the cotton linters is a by product of a cotton seed delinting operation.

20. The composition of claim 17 wherein the wood fiber is a by product of a particle board manufacturing operation, and the cotton linters is a by product of a cotton seed delinting operation.

* * * * *